United States Patent
Watanabe et al.

(10) Patent No.: US 10,489,641 B2
(45) Date of Patent: Nov. 26, 2019

(54) IMAGE PROCESSING APPARATUS, IMAGE PROCESSING SYSTEM, AND IMAGE PROCESSING METHOD

(71) Applicant: Panasonic Intellectual Property Management Co., Ltd., Osaka (JP)

(72) Inventors: Kou Watanabe, Osaka (JP); Masahiko Yamamoto, Osaka (JP); Masaaki Higashida, Osaka (JP); Tsutomu Uenoyama, Osaka (JP); Takeshi Hatakeyama, Osaka (JP); Satoshi Ohyama, Hyogo (JP); Takahiro Yamaguchi, Osaka (JP); Masaharu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/900,010

(22) Filed: Feb. 20, 2018

(65) Prior Publication Data
US 2019/0050638 A1 Feb. 14, 2019

Related U.S. Application Data

(60) Provisional application No. 62/542,822, filed on Aug. 9, 2017.

(51) Int. Cl.
*G06K 9/00* (2006.01)
*G06T 7/20* (2017.01)

(52) U.S. Cl.
CPC ............ *G06K 9/00369* (2013.01); *G06T 7/20* (2013.01)

(58) Field of Classification Search
CPC .............................. G06K 9/00369; G06T 7/20
USPC ........................................................ 382/115
See application file for complete search history.

(56) References Cited

U.S. PATENT DOCUMENTS

| 7,957,565 B1* | 6/2011 | Sharma | G06K 9/00778 |
| | | | 382/103 |
| 2012/0281079 A1* | 11/2012 | Chhibber | G06K 9/00288 |
| | | | 348/77 |

* cited by examiner

*Primary Examiner* — Amandeep Saini
(74) *Attorney, Agent, or Firm* — Wenderoth, Lind & Ponack, L.L.P.

(57) ABSTRACT

A server is an image processing apparatus that is connectable to one or more cameras, which shoot images inside an aircraft, and distinguishes a crewmember from among a plurality of people present inside the aircraft. The server includes a memory and a processor. The memory stores image data output from the cameras and behavior patterns specific to the crewmember. The processor determines the crewmember from among the plurality of people by detecting a behavior specific to the crewmember from the image data stored in the memory based on the behavior patterns specific to the crewmember, and outputs a result of the determination.

12 Claims, 9 Drawing Sheets

IMAGE PROCESSING APPARATUS, IMAGE PROCESSING SYSTEM, AND IMAGE PROCESSING METHOD

CROSS-REFERENCE TO RELATED APPLICATIONS

This patent application claims the benefit of U.S. Provisional Patent Application 62/542,822, filed Aug. 9, 2017, the disclosure of which is incorporated herein by reference.

BACKGROUND

Technical Field

The present disclosure relates to an image processing apparatus, an image processing system, and an image processing method that distinguish a crewmember from among a plurality of people present inside a mobile body.

Description of the Related Art

In recent years, for example, there have been ideas to analyze images that have been shot inside a store for the purpose of estimating the sexes and ages of people included in the images and utilizing them in marketing, for the purpose of extracting the circulation of workers and utilizing them for business improvement, and so on.

Incidentally, in a mobile body, such as an aircraft, a plurality people including passengers and crewmembers coexist in a small space, and it is thus difficult to distinguish a crewmember from among the plurality of people with high accuracy.

SUMMARY

The present disclosure provides an image processing apparatus, an image processing system, and an image processing method that are effective in distinguishing a crewmember from among a plurality of people present inside a mobile body.

An image processing apparatus according to the present disclosure is an image processing apparatus that is connectable to one or more cameras, which shoot images inside a mobile body, and distinguishes a crewmember from among a plurality of people present inside the mobile body. The image processing apparatus includes a memory and a processor. The memory stores image data output from the cameras and behavior patterns specific to the crewmember. The processor determines the crewmember from among the plurality of people by detecting a behavior specific to the crewmember from the image data stored in the memory based on the behavior patterns specific to the crewmember, and outputs a result of the determination.

An image processing system according to the present disclosure is an image processing system that distinguishes a crewmember from among a plurality of people present inside a mobile body, and includes one or more cameras, a memory, and a processor. One or more cameras shoot images inside the mobile body, and output image data. The memory stores the image data and behavior patterns specific to the crewmember. The processor determines the crewmember from among the plurality of people by detecting a behavior specific to the crewmember from the image data stored in the memory based on the behavior patterns specific to the crewmember, and outputs a result of the determination.

An image processing method according to the present disclosure is an image processing method using an image processing apparatus that distinguishes a crewmember from among a plurality of people present inside a mobile body. The image processing method includes: with use of one or more cameras installed inside the mobile body, shooting images inside the mobile body and outputting image data; storing, to a memory, the image data and behavior patterns specific to the crewmember; and with use of a processor of the image processing apparatus, determining the crewmember from among the plurality of people by detecting a behavior specific to the crewmember from the image data stored in the memory based on the behavior patterns specific to the crewmember, and outputting a result of the determination.

The image processing apparatus, the image processing system, and the image processing method according to the present disclosure are effective in distinguishing a crewmember from among a plurality of people present inside a mobile body.

DESCRIPTION OF EMBODIMENTS

The following describes embodiments in detail with reference to the drawings as appropriate. Note that explanations that are more detailed than is required may be omitted. For example, a detailed description of matters that are already well-known, and an overlapping description of practically identical components, may be omitted. This is to avoid needless redundancy in the following description, and to facilitate the understanding of a person skilled in the art.

Note that the attached drawings and the following description are provided in order for a person skilled in the art to sufficiently understand the present disclosure, and they are not intended to limit the subject matters described in the claims.

Furthermore, in the following description, "images" imply both still images and moving images, and "images" are used under the assumption that they also include "videos" unless specifically stated otherwise.

First Embodiment

[1-1. Components]

Figure 1:
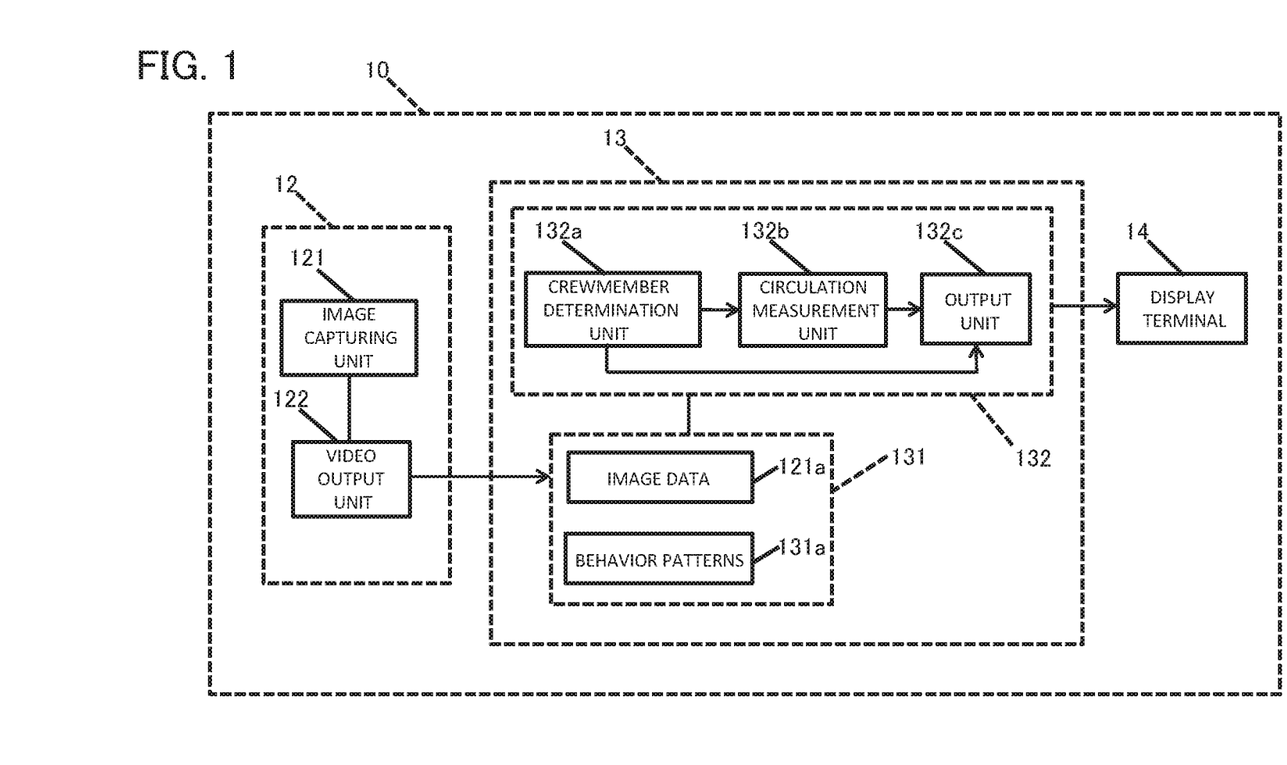
FIG. 1 schematically shows components of an image processing system according to a first embodiment.

FIG. 1 is a schematic diagram of an image processing system 10 according to a first embodiment. The image processing system 10 distinguishes a crewmember from among a plurality of people present inside a mobile body. In the present embodiment, a crewmember is distinguished from among a plurality of people present inside an aircraft 11 (see FIG. 2). That is to say, the image processing system 10 distinguishes a crewmember inside the aircraft 11 in which a plurality of people including passengers and crewmembers coexist.

The image processing system 10 includes one or more cameras 12, a server 13 (one example of an image processing apparatus), and a display terminal 14 (one example of an external device).

One or more cameras 12 shoot images inside the aircraft 11. One or more cameras 12 include an image capturing unit 121 and a video output unit 122. The image capturing unit 121 shoots images including aisle areas, seat areas, and working areas for crewmembers inside the aircraft 11. The video output unit 122 outputs the images shot by the image capturing unit 121 to a server 13 as image data 121a. Preferably, the image data 121a contains at least one of time information of times at which the images were shot and position information of positions at which the images were shot. Note that the video output unit 122 may output the image data 121a to the server 13 either wired or wirelessly.

Figure 2:
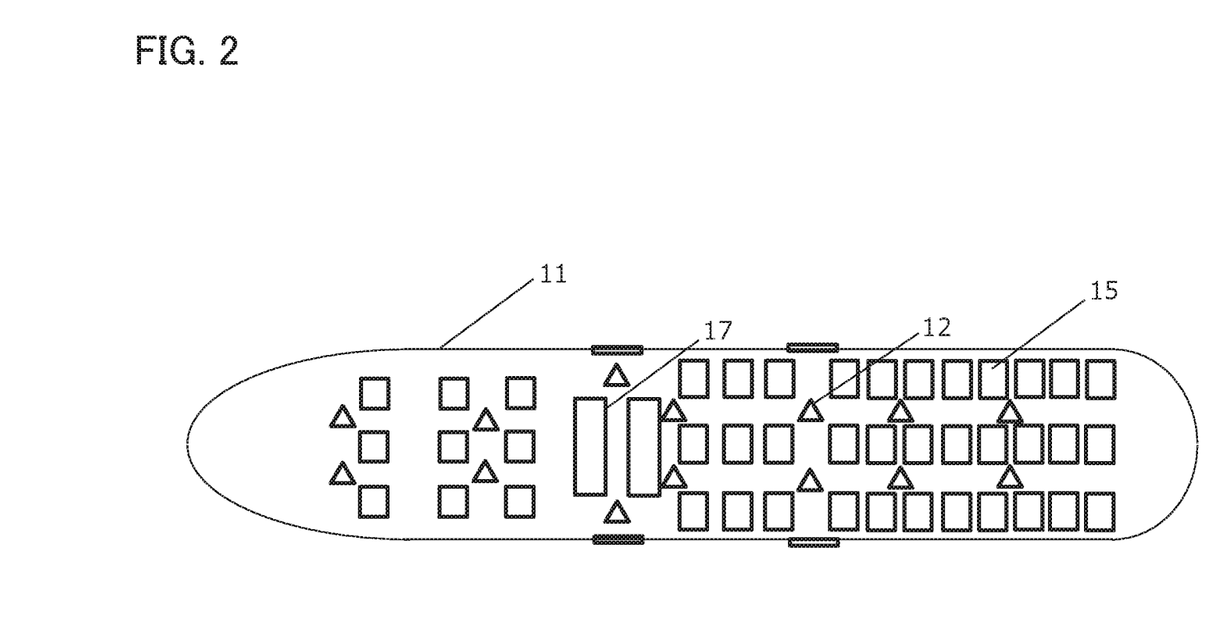
FIG. 2 shows an example of an arrangement of cameras placed inside an aircraft.
Figure 3:
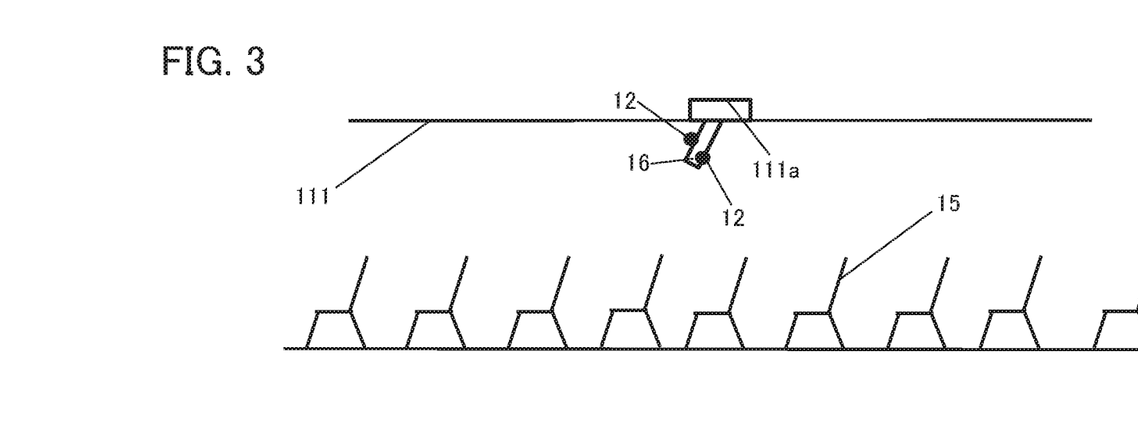
FIG. 3 shows an example in which cameras are mounted on an openable and closable monitor.

FIG. 2 shows an example of an arrangement of one or more cameras 12 placed inside the aircraft 11. One or more cameras 12 are, for example, installed in plurality at different positions on the ceilings of the aisles inside the aircraft 11. Note that one or more cameras 12 may be installed, for example, on the ceilings of passenger seats 15, on sidewalls and bulkheads inside the aircraft 11, etc. Furthermore, as shown in FIG. 3, one or more cameras 12 may be mounted on a monitor 16 that displays videos and the like to passengers. The monitor 16 is installed, in an openable and closable state, in a housing unit 111a mounted on a ceiling 111 inside the aircraft 11. Furthermore, one or more cameras 12 may be installed on the ceilings or walls near the entrances of a galley 17, which is a working space for crewmembers.

The server 13 is a computer apparatus installed inside the aircraft 11. The server 13 is connectable, either wired or wirelessly, to one or more cameras 12 and the display terminal 14 via a non-illustrated interface. The server 13 includes a memory 131 and a processor 132. The server 13 is an image processing apparatus that is realized by reading out and executing various types of programs stored in the memory 131.

Examples of the memory 131 include a ROM in which programs and data are held in advance, a RAM to be used in storing data and the like at the time of execution of programs, etc. The memory 131 stores the image data 121a output from one or more cameras 12. Furthermore, control programs executed by the processor 132, as well as behavior patterns 131a specific to crewmembers, are stored in the memory 131 in advance. Note that the details of the behavior patterns 131a specific to crewmembers will be described later.

The processor 132 executes various types of processing in accordance with programs stored in the memory 131. As shown in FIG. 1, the processor realizes the functions of a crewmember determination unit 132a, a circulation measurement unit 132b, and an output unit 132c.

The crewmember determination unit 132a determines a crewmember from among a plurality of people by detecting a behavior specific to crewmembers from the image data 121a based on the behavior patterns 131a specific to crewmembers, which are stored in the memory 131. The behavior patterns 131a specific to crewmembers according to the first embodiment include, for example, the following behaviors.

Seated on a seat for a crewmember, which is used at the time of takeoff     Stay in the galley for a certain time period     Operate a crew-exclusive operation terminal     Move along an aisle, together with a cart that carries food and beverages     Two or more people wearing the same clothes are present around a cart     Operate a crew-exclusive on-board communication device Note that information related to, for example, the positions and shapes of the seats for crewmembers, galley, aisles, exclusive communication devices, operation terminals, carts, and the like is stored in the memory 131 in advance.

The crewmember determination unit 132a determines a crewmember from among a plurality of people present inside the aircraft 11 by detecting a behavior specific to crewmembers from the image data 121a stored in the memory 131 based on the behavior patterns 131a specific to crewmembers. Specifically, the crewmember determination unit 132a determines a person from the image data 121a based on the shape of a human face or the shape of Ω composed of a head and shoulders. Upon detecting a behavior specific to crewmembers from the determined person, it allocates ID information to the person who exhibited that behavior. Note that it is sufficient to specify a person and detect a behavior specific to crewmembers using, for example, person detection means of a known technique.

The circulation measurement unit 132b records activities of the crewmember to whom the ID information has been allocated by the crewmember determination unit 132a at an interval of a certain time period, and measures the circulation of the crewmember to whom the ID information has been allocated. Note that it is sufficient to use a known technique as a method of measuring the circulation.

The output unit 132c outputs a result of the determination from the crewmember determination unit 132a to the display terminal 14. The output unit 132c also outputs circulation information and position information of the crewmember measured by the circulation measurement unit 132b to the display terminal 14. The output unit 132c may display the circulation information on the display terminal 14 by superimposing a picture over an image, or may display a heat map that indicates, using different colors, overcrowding related to time periods during which crewmembers stayed in a predetermined position. Furthermore, display of the circulation information and the position information may be updated on the elapse of a certain time period. Alternatively, they may be displayed with a change in darkness and lightness of colors over time in the following manner: they are displayed in dark colors immediately after the detection of the circulation, and their colors turn light as time passes. Furthermore, the output unit 132c may determine an area with a low frequency of visits by crewmembers based on the circulation information, and prompt the crewmembers to visit the area with the low frequency of visits by automatically displaying the determined area or repeatedly displaying a plurality of areas in sequence.

The display terminal 14 is, for example, an operation terminal provided with a touchscreen display, and displays information output from the output unit 132c. Note that the display terminal 14 is preferably a crew-exclusive operation terminal.

[1-2. Operations]

Figure 4:
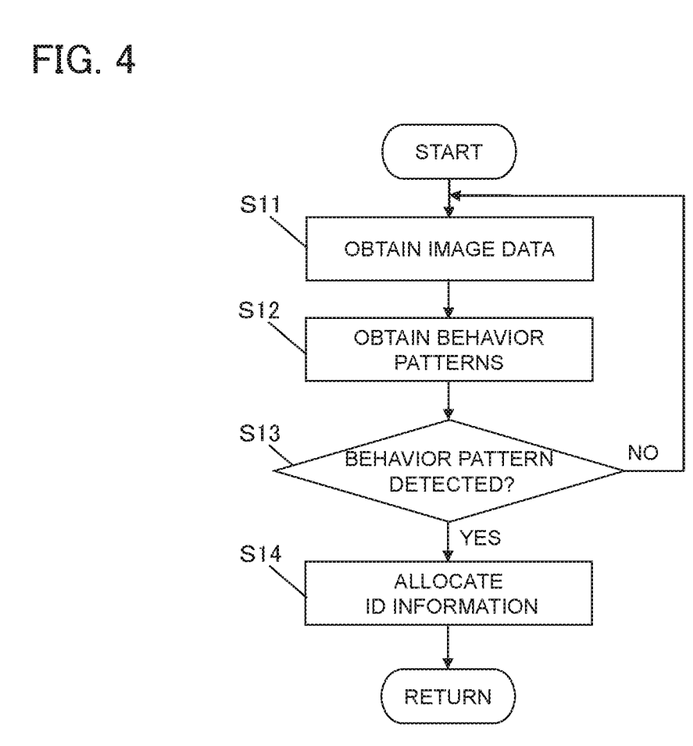
FIG. 4 is a flowchart showing operations executed by an image processing apparatus according to the first embodiment.

FIG. 4 shows one example of determination processing of the crewmember determination unit 132a executed by the processor 132.

Step S11: The crewmember determination unit 132a obtains the image data 121a stored in the memory 131.

Step S12: The crewmember determination unit 132a obtains the behavior patterns 131a of crewmembers from the memory 131.

Step S13: The crewmember determination unit 132a determines a person from the image data 121a based on the shape of a human face or the shape of Ω composed of a head and shoulders. It proceeds to step S14 upon detecting that the behavior of that person matches the behavior patterns 131a of crewmembers obtained in step S12. The following describes, as an example, a case where seating of a person on a seat for a crewmember has been detected. Note that if the behavior of the person that matches the behavior patterns 131a specific to crewmembers cannot be detected from the image data 121a, the determination processing is executed repeatedly with a return to step S11.

Step S14: The crewmember determination unit 132a determines the person who exhibited the behavior that matches the behavior patterns 131a specific to crewmembers (here, a person seated on a seat for a crewmember) in step S13 as a crewmember, and allocates ID information to an image of the person who has been distinguished as the crewmember. Note that after the ID information has been allocated, the determination processing from step S11 is executed repeatedly with a return to the start. That is to say, a crewmember is distinguished from among a plurality of people (excluding the person to whom the ID information has been allocated).

[1-3. Features, Etc.]

In the image processing system 10 configured in the above-described manner, the processor determines a crewmember by detecting a behavior specific to crewmembers from the image data 121a. In this way, inside the aircraft 11 in which a plurality of people including passengers and crewmembers coexist, a crewmember can be distinguished with high accuracy.

Second Embodiment

[2-1. Components]

The following describes an image processing system 20 according to a second embodiment. Note that the components, functions, operations, and the like that are similar to those according to the first embodiment will be treated with reference to the same drawings and reference signs, and a description and graphical presentation thereof will be omitted.

Figure 5:
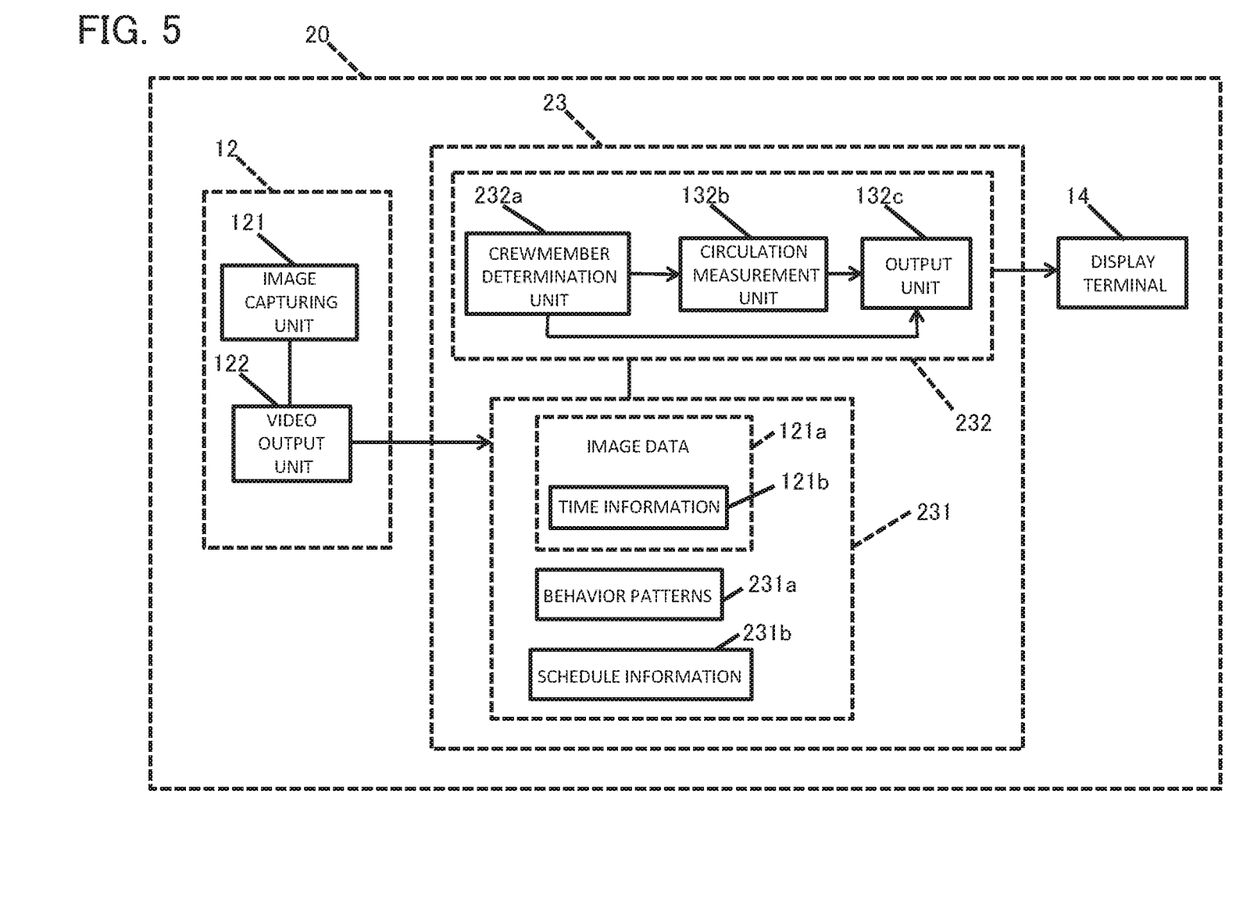
FIG. 5 schematically shows components of an image processing system according to a second embodiment.

FIG. 5 is a schematic diagram of the image processing system 20 according to the second embodiment. In the second embodiment, a memory 231 stores schedule information 231b of an aircraft. The schedule information 231b of the aircraft 11 contains, for example, such information as time before takeoff, time of takeoff, and times to provide food and beverages to passengers. The schedule information 231b may be stored in the memory 231 in advance, or may be obtained from flight information that is obtained from another system inside the aircraft. Furthermore, image data 121a contains time information 121b of times at which images were shot.

A processor 232 determines a crewmember from among a plurality of people by detecting a behavior specific to crewmembers from the image data 121a based on behavior patterns 231a specific to crewmembers, the schedule information 231b, and the time information 121b stored in the memory 231. The behavior patterns 231a specific to crewmembers according to the second embodiment are set in association with the schedule information 231b. The behavior patterns 231a specific to crewmembers include, for example, the following behaviors.

Confirm that a plurality of (e.g., three or more) luggage compartments are locked before takeoff Move along an aisle during playback of a safety video before takeoff Seated on a crew-exclusive seat at the time of takeoff Move along an aisle, together with a cart that carries food and beverages, at the time to provide food and beverages to passengers Two or more people wearing the same clothes are present around a cart at the time to provide food and beverages to passengers Enter or exit a galley at the time to provide food and beverages to passengers Stay in the galley for a certain time period at, before, or after the time to provide food and beverages to passengers As other components are similar to those according to the embodiment described earlier, a description thereof will be omitted.

[2-2. Operations]

Figure 6:
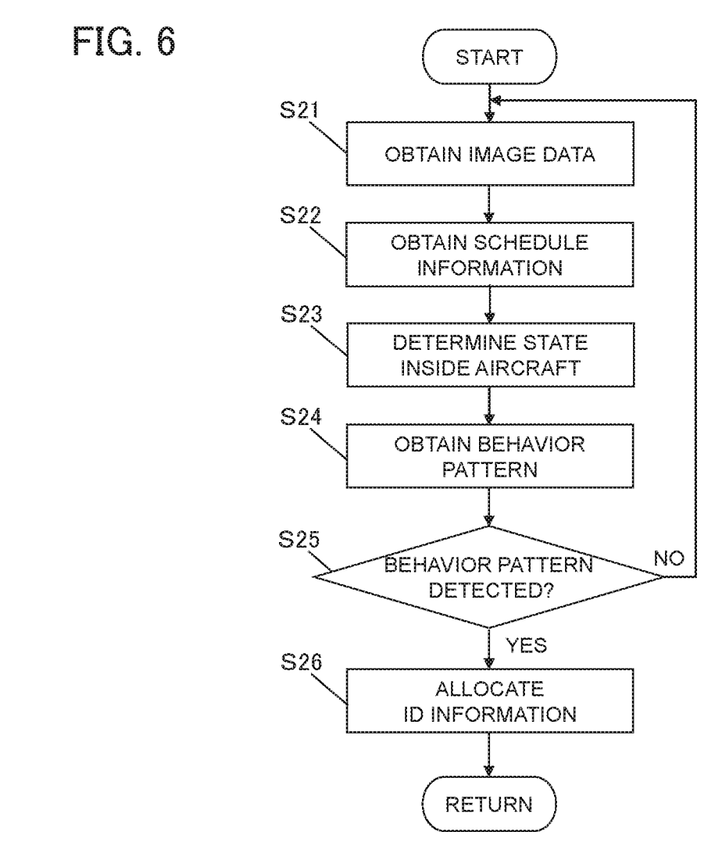
FIG. 6 is a flowchart showing operations executed by an image processing apparatus according to the second embodiment.

FIG. 6 shows one example of determination processing of a crewmember determination unit 232a executed by the processor 232.

Step S21: The crewmember determination unit 232a obtains the image data 121a that contains the time information 121b and is stored in the memory 231.

Step S22: The crewmember determination unit 232a obtains the schedule information 231b stored in the memory 231.

Step S23: The crewmember determination unit 232a determines a state inside the aircraft 11 at the time of obtainment of the image data from the time information 121b in the image data 121a and the schedule information 231b. Specifically, for example, it determines that the state inside the aircraft 11 is the time of takeoff if the time information 121b in the image data 121a corresponds to the time of takeoff in the schedule information 231b.

Step S24: The crewmember determination unit 232a obtains, from the memory 231, a behavior pattern 231a specific to crewmembers that corresponds to the state inside the aircraft 11 determined in step S23. Here, for example, it obtains a behavior pattern 231a indicating seating on a crew-exclusive seat from the memory 231.

Step S25: If the crewmember determination unit 132a detects a person who exhibits a behavior that matches the behavior pattern 231a of crewmembers obtained in step S24, that is to say, a person who is seated on a crew-exclusive seat, it proceeds to step S26. If a behavior specific to crewmembers cannot be detected from the image data 121a, the determination processing is executed repeatedly with a return to step S21.

Step S26: The crewmember determination unit 232a determines the person seated on the seat for a crewmember as a crewmember, specifies that person from the image data 121a, and allocates ID information to an image of the specified person.

[2-3. Features, Etc.]

In the image processing system 20 configured in the above-described manner, the processor 232 determines a crewmember by detecting a behavior specific to crewmembers from the image data 121a based on the time information 121b of times at which images were shot and the schedule information 231b. In this way, inside the aircraft 11 in which a plurality of people including passengers and crewmembers coexist, a crewmember can be distinguished with high accuracy.

Third Embodiment

[3-1. Components]

Figure 7:
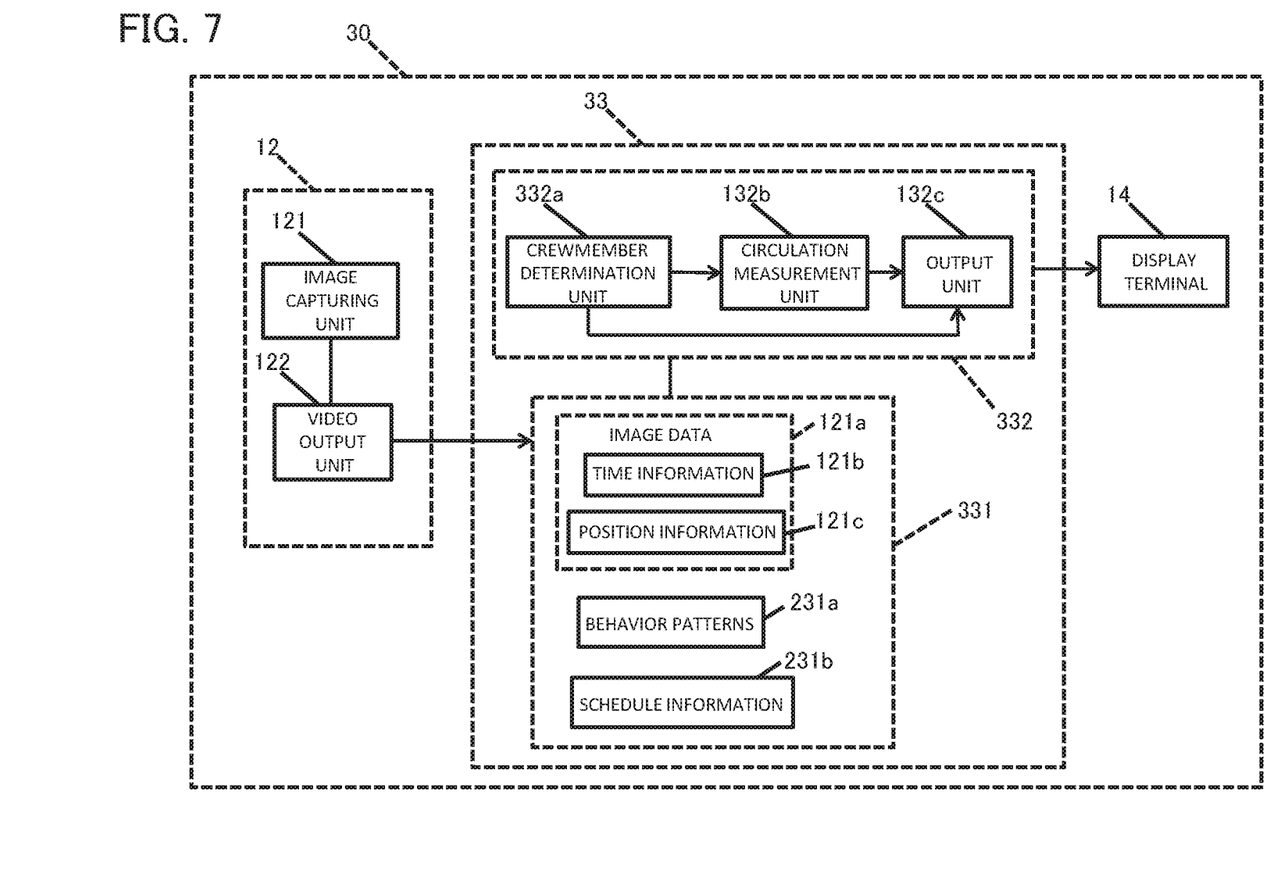
FIG. 7 schematically shows components of an image processing system according to a third embodiment.

The following describes an image processing system 30 according to a third embodiment. FIG. 7 is a schematic diagram of the image processing system 30 according to the third embodiment. In the third embodiment, image data 121a further contains position information 121c of one or more cameras 12 that shot images.

A processor 332 determines a crewmember from among a plurality of people by detecting a behavior specific to crewmembers from the image data 121a based on behavior patterns 231a specific to crewmembers, schedule information 231b, time information 121b, and the position information 121c stored in a memory 331. The memory 331 stores the position information of one or more cameras 12. As other components are similar to those according to the second embodiment, a description thereof will be omitted.

[3-2. Operations]

Figure 8:
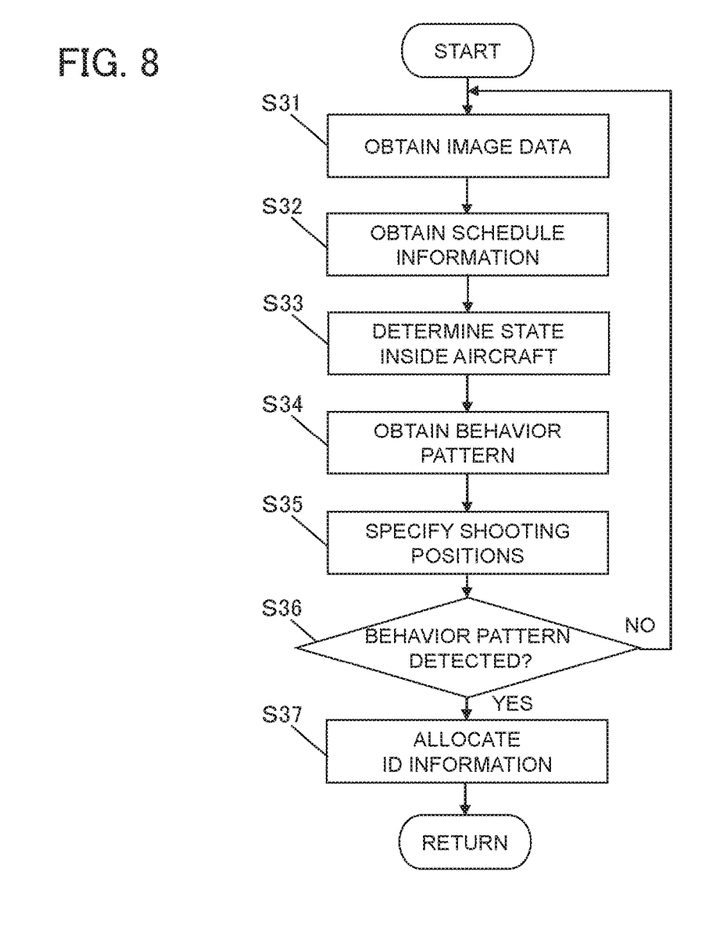
FIG. 8 is a flowchart showing operations executed by an image processing apparatus according to the third embodiment.

FIG. 8 shows one example of determination processing of a crewmember determination unit 332a executed by the processor 332.

The determination processing of the crewmember determination unit 332a from step S31 to step S34 is similar to step S21 to step S24 according to the second embodiment.

Step S35: The crewmember determination unit 332a specifies, from the position information 121c in the image data 121a, one or more cameras 12 capable of shooting a behavior pattern 231a specific to crewmembers that was obtained in step S34. Specifically, for example, if a behavior pattern indicating seating on a crew-exclusive seat was obtained in step S34, image data 121a obtained by shooting a range including the crew-exclusive seat is specified from the position information 121c in the image data 121a.

Step S36: If the crewmember determination unit 132a detects a person who exhibits a behavior that matches the behavior pattern 231a of crewmembers obtained in step S34, that is to say, a person who is seated on a crew-exclusive seat, from the image data 121a specified in step S35, it proceeds to step S37. The determination processing of the crewmember determination unit 332a in step S37 is similar to step S26 according to the second embodiment.

Note that if the person who exhibits the behavior that matches the behavior pattern 231a specific to crewmembers is detected from image data 121a of a plurality of cameras in step S36, the determination processing may be executed by preferentially using image data 121a of a camera that yields a matching detection result or is positioned close to a target (herein, the crew-exclusive seat).

[3-3. Features, Etc.]

In the image processing system 30 configured in the above-described manner, the processor 332 determines a crewmember by detecting a behavior specific to crewmembers from the image data 121a based on the schedule information 231b, the time information 121b, and the position information 121c. In this way, inside the aircraft 11 in which a plurality of people including passengers and crewmembers coexist, a crewmember can be distinguished promptly with high accuracy.

Other Embodiments

The first, second, and third embodiments have been described above as examples of techniques disclosed in the present application. However, the techniques of the present disclosure are not limited to these, and are applicable to the embodiments in which changes, replacements, additions, and omissions are made as appropriate. Furthermore, the constituent elements and functions explained in the above first, second, and third embodiments may be combined into new embodiments.

[1]

Although the above-described embodiments have presented a mobile body as an aircraft by way of example, the mobile body may be another vehicle, for example, a train, a ship, etc.

[2]

The behavior patterns 131a, 231a specific to crewmembers are not limited to the above-described embodiments. Furthermore, although the behavior patterns 231a specific to crewmembers are set in association with the schedule information 231b in the second embodiment, all of the behavior patterns 231a need not necessarily be set in association with the schedule information 231b. For example, in the second embodiment, the behavior patterns 131a specific to crewmembers according to the first embodiment may be included, and behavior patterns specific to crewmembers that are not associated with the schedule information 231b may be included.

[3]

Although a behavior specific to crewmembers is detected from the image data 121a based on the behavior patterns 131a specific to crewmembers in the above-described first embodiment, a behavior specific to crewmembers may be detected from the image data 121a based on, for example, the behavior patterns 131a specific to crewmembers and the position information 121c of positions at which images were shot. Furthermore, the position information 121c may not be position information of the cameras 12, and may be, for example, position information of targets associated with behavior patterns specific to crewmembers. Examples of such targets include crew-exclusive seats, a galley, and aisles. In addition, the position information 121c may contain position information of the cameras and position information of targets associated with behavior patterns specific to crewmembers.

[4]

Programs for executing the operations of the processor 132 according to the above-described embodiments may be stored in the memory 131 and the like in advance, or may be stored in a memory of another computer apparatus and obtained via a network. The same goes for the behavior patterns 131a specific to crewmembers and the schedule information 231b.

[5]

Although the output unit 132c outputs the circulation information measured by the circulation measurement unit 132b to the display terminal 14 in the above-described embodiments, the circulation measurement unit 132b need not necessarily be included as a function of the processor 132. The processor 132 may merely output a result of the determination from the crewmember determination unit 132a to an external device.

[6]

Figure 9:
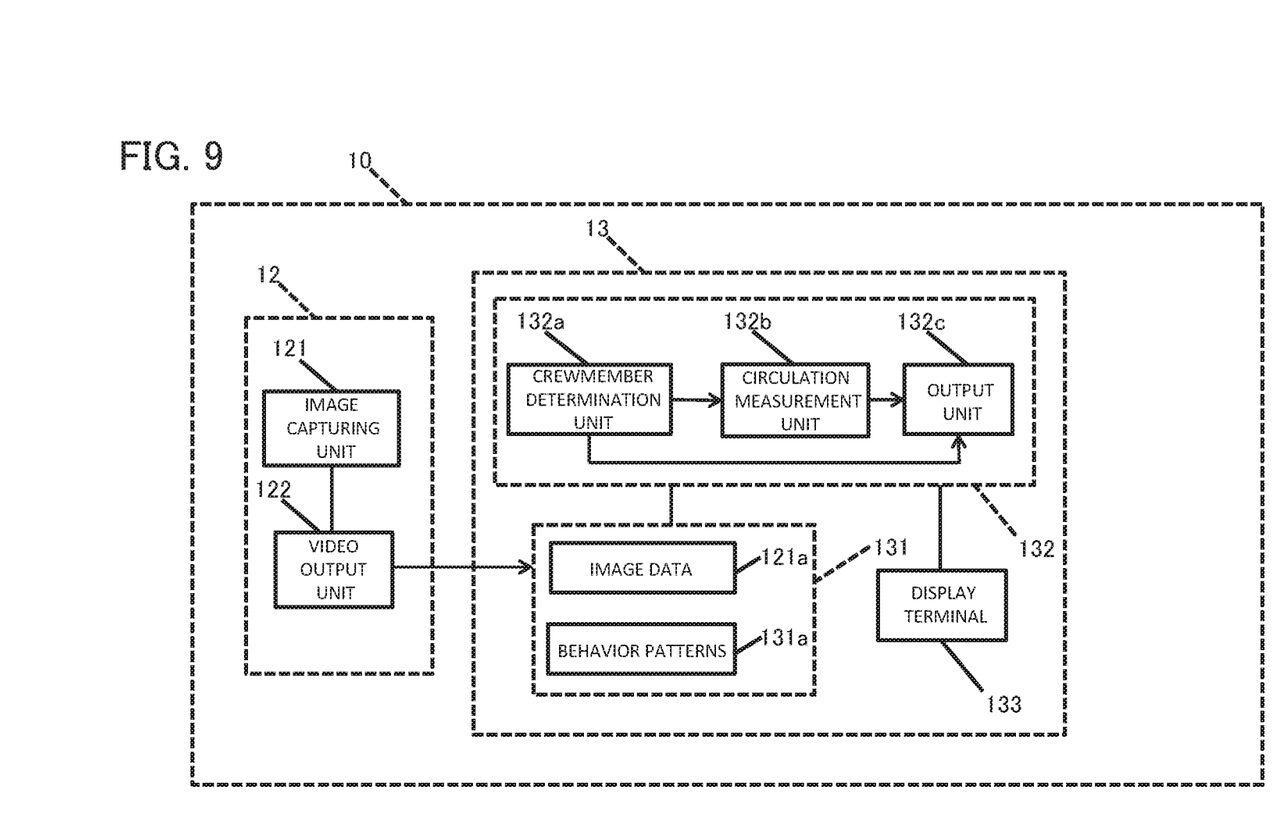
FIG. 9 schematically shows components of an image processing system according to another embodiment.

Although a result of the determination from the crewmember determination unit 132a and the like are output to the display terminal 14 in the above-described embodiments, it is possible to adopt a configuration in which, as shown in FIG. 9, the server 13 includes a display unit 133 that displays an output result from the output unit 132c, and the display unit 133 of the server 13 displays a result of the determination from the crewmember determination unit 132a and the like.

[7]

The present disclosure is not limited to being implemented in accordance with a mode of the server 13. A determination processing method and computer programs executed by the processor 132, as well as a computer-readable recording medium having recorded therein such programs, are included in the scope of the present disclosure. The computer programs may be transmitted via, for example, a network, which is typically an electric communication line, a wireless or wired communication line, or the Internet.

What is claimed is:

1. An image processing apparatus that is connectable to one or more cameras and distinguishes a crewmember from among a plurality of people present inside an aircraft, the one or more cameras shooting images inside the aircraft, the image processing apparatus comprising:
    a memory that stores image data output from the cameras, the image data including image data of the plurality of people; and
    a processor that makes a determination as to which of the plurality of people is the crewmember by detecting an image of a person seated on a crew-exclusive seat in the aircraft at a time of takeoff of the aircraft.

2. The image processing apparatus according to claim 1, wherein the processor measures a circulation of a person who has been determined as the crewmember, and outputs at least one of circulation information of the measured circulation and position information of the person.

3. The image processing apparatus according to claim 1, further comprising a display unit that displays a result of the determination by the processor.

4. An image processing system comprising:
    the image processing apparatus according to claim 1; and
    the one or more cameras connected to the image processing apparatus, wherein the one or more cameras are configured to shoot the images inside the aircraft and output the image data.

5. The image processing system according to claim 4, wherein the processor measures a circulation of a person who has been determined as the crewmember, and outputs at least one of circulation information of the measured circulation and position information of the person.

6. The image processing system according to claim 4, further comprising an external device to which a result of the determination by the processor is output.

7. An image processing apparatus that is connectable to one or more cameras and distinguishes a crewmember from among a plurality of people present inside a mobile body, the one or more cameras shooting images inside the mobile body, the image processing apparatus comprising:
    a memory that stores image data output from the cameras, the image data including image data of the plurality of people; and
    a processor that makes a determination as to which of the plurality of people is the crewmember by detecting an image of: a person operating a crew-exclusive operation terminal in the mobile body; or a person operating a crew-exclusive on-board communication device in the mobile body.

8. The image processing apparatus according to claim 7, wherein the processor measures a circulation of a person who has been determined as the crewmember, and outputs at least one of circulation information of the measured circulation and position information of the person.

9. The image processing apparatus according to claim 7, further comprising a display unit that displays a result of the determination by the processor.

10. An image processing system comprising:
    the image processing apparatus according to claim 7; and
    the one or more cameras connected to the image processing apparatus, wherein the one or more cameras are configured to shoot the images inside the aircraft and output the image data.

11. The image processing system according to claim 10, wherein the processor measures a circulation of a person who has been determined as the crewmember, and outputs at least one of circulation information of the measured circulation and position information of the person.

12. The image processing system according to claim 10, further comprising an external device to which a result of the determination by the processor is output.

* * * * *